United States Patent Office 2,719,970
Patented Oct. 4, 1955

2,719,970
PROCESS FOR PREPARATION OF ALLYLSUCROSE

Edward L. Griffin, Jr., Glenside, Howard I. Sinnamon, Philadelphia, and Miles J. Willard, Jr., Glenside, Pa., assignors to the United States of America as represented by the Secretary of Agriculture No Drawing. Application October 14, 1952,
Serial No. 314,755

1 Claim. (Cl. 260—209)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to allylsucrose and to methods for its preparation. The object of this invention is to provide improved processes for the preparation of allylsucrose.

Allylsucrose is useful as a coating material and as an upgrader of drying and semidrying oils.

The conventional process for the manufacture of allylsucrose is described by Zief and Yanovsky, Industrial and Engineering Chemistry, vol. 41, pp. 1697–1700 (August 1949). Sucrose is treated with an allyl halide in the presence of an excess of a strong alkali. After completion of the reaction, the excess alkali is removed by prolonged washing with water. This results in the formation of troublesome emulsions which make separation of the wash water from the product tedious and results in considerable loss of product in the washings. Subsequently the product is dissolved in an organic solvent, dried with a chemical dessicant and partially decolorized with activated carbon. In this conventional process the purification of the product is tedious and expensive because of the prolonged washing and the treatment with activated carbon. Attempts to shorten the washing step by neutralizing the residual alkali with mineral acid and then washing out the salt formed have had little success because of an undesirable darkening of the color of the product.

We have now discovered a simple and inexpensive process of preparing substantially pure allylsucrose. According to this process, sucrose is reacted with an excess of allyl halide and alkali to form allylsucrose contaminated with by-product alkali metal halide (salt) and excess alkali. The contaminated allylsucrose is then washed with water to remove most of the alkali metal halide and alkali contaminants, this wash preferably being a short wash using a relatively small amount of water. The washed allylsucrose is then mixed with water, preferably a small amount, and the mixture then steam distilled to remove excess allyl halide and any volatile by-products, such as volatile organic compounds, that may be present, and the formed colored aqueous layer containing a large part of the colored impurities is then separated from the allylsucrose. The resulting steam distilled allylsucrose is treated with phosphoric acid to neutralize residual alkali and the neutralized allylsucrose then vacuum dried to remove water and to cause complete precipitation of any residual alkali metal halide and any other solids which are then separated from the resulting substantially pure allysucrose, as by filtration. The product is light colored and ordinarily does not require a decolorizing treatment.

Our process has several distinct advantages over the processes of the prior art:

1. Prolonged washing to remove alkali and salt is avoided, thus saving time, avoiding material losses in the wash water and reducing the problem of disposing of the wash water.
2. Better control of the pH of the product is achieved.
3. The use of an organic solvent is eliminated.
4. The use of a decolorizing agent is eliminated.
5. The use of chemical desiccants is eliminated.

When allylsucrose is washed with water it typically forms a stable water-in-oil emulsion containing 20 to 40% water. This emulsified water, and any salt dissolved therein, is not readily separated from the allylsucrose. We have found that this water is best removed by moderate heat under vacuum, such as a temperature of 135 to 150° F. under a vacuum of 27 to 28.5 inches of mercury. Removal of the water causes complete precipitation of the salt and permits removal of the latter by filtration.

Our process is illustrated by the following example.

Example

Allylsucrose was prepared by reacting 33 lb. of sucrose, 88.5 lb. of allyl chloride, 46.2 lb. of sodium hydroxide and 23.1 lb. of water substantially as described by Griffin, Willard, Sinnamon, Edwards and Redfield, Ind. Eng. Chem., 43, 2629 (1951).

When the reaction was complete, part of the volatile materials was flashed off and the residue was washed once with 125 lb. of water, which removed most of the alkali and salt present. After drawing off the water layer, 45 lb. of water were added and the mixture was steam distilled to remove remaining volatile compounds. After cooling the product and separating it from the water layer which contained a large part of the colored impurities, the batch was neutralized with phosphoric acid to a pH of 7.2 as measured with a glass electrode in the allylsucrose. The water in the product was then removed by heating to 140° F. under a vacuum of 28 in. of mercury. Solid impurities were then removed by filtration. The product was a light colored liquid, its Gardner color usually being in the range 4 to 6.

In the neutralization step, little phosphoric acid was required (0.1 to 0.2 lb.) and it was used as a 5% aqueous solution.

The use of other acids, such as sulfuric, hydrochloric, acetic or carbonic acids instead of phosphoric acid always resulted in a product of much darker color.

Neutralization of the residual alkali before the steam distillation step resulted in an unstable pH and necessitated a second pH adjustment after steam distillation.

We claim:

A process for preparing substantially pure allylsucrose comprising reacting sucrose with an excess of allyl halide and alkali to form allylsucrose contaminated with by-product alkali metal halide and excess alkali, washing the contaminated allylsucrose with water to remove most of the alkali metal halide and alkali contaminants, mixing the washed allylsucrose with water and steam distilling the mixture to remove excess allyl halide and any volatile by-products, separating the formed colored aqueous layer containing a large part of the colored impurities from the allylsucrose, treating the resulting steam distilled allylsucrose with phosphoric acid to neutralize residual alkali, vacuum drying the neutralized allylsucrose to remove water and to cause complete precipitation of any residual alkali metal halide and any other solids, and separating the alkali metal halide and solids from the resulting substantially pure allylsucrose.

References Cited in the file of this patent

UNITED STATES PATENTS 2,574,545   De Groote _____ Nov. 13, 1951

OTHER REFERENCES

Zief et al., Ind. and Eng. Chem., 41, 1697–1700 (1949).